United States Patent [19]
Dittli et al.

[11] Patent Number: 5,663,877
[45] Date of Patent: Sep. 2, 1997

[54] SYNCHRONOUS RECTIFIER THAT IS IMPERVIOUS TO REVERSE FEED

[75] Inventors: René Dittli, Duernten; Philip Allington, Uster, both of Switzerland

[73] Assignee: Melcher, AG, Uster, Switzerland

[21] Appl. No.: 351,286

[22] PCT Filed: Sep. 14, 1993

[86] PCT No.: PCT/CH93/00224

§ 371 Date: Dec. 8, 1995

§ 102(e) Date: Dec. 8, 1995

[87] PCT Pub. No.: WO95/02917

PCT Pub. Date: Jan. 26, 1995

[51] Int. Cl.[6] .................................... H02M 7/217
[52] U.S. Cl. ...................... 363/127; 363/21; 363/17; 363/89
[58] Field of Search ................... 363/21, 53, 17, 363/77, 88, 89, 127

[56] References Cited

U.S. PATENT DOCUMENTS 5,343,383  8/1994  Shinada et al. .................... 363/127

*Primary Examiner*—Peter S. Wong
*Assistant Examiner*—Shawn Riley
*Attorney, Agent, or Firm*—Jenkens & Gilchrist, a Professional Corp.

[57] ABSTRACT

A synchronous rectifier having two MOSFETs and a transformer with a primary winding and a first and second secondary winding in the transformer and a control device in the rectifier circuitry. The second secondary winding (tertiary winding) and the control device are connected within the synchronous rectifier to provide protection for the two MOSFETs from destruction caused by reverse feed.

3 Claims, 2 Drawing Sheets

SYNCHRONOUS RECTIFIER THAT IS IMPERVIOUS TO REVERSE FEED

BACKGROUND

The present invention relates to a synchronous rectifier, that is impervious to reverse feed.

Feeder devices with synchronous rectifiers are known per se, and are in use as electric power supply devices. In the same way, such devices are known from publications, for example, from O. Kilgenstein, Schaltnetzteile in der Praxis, Wuerzburg, 1992. Each of the known devices has a range of operation that is limited at the top by the maximum output current at which the output voltage is still regulated to the desired value.

If either temporarily or for long periods the current requirement is greater than the capacity of a single device, and the selection of a similar device of greater capacity is not indicated for certain reasons, then these devices are connected in parallel.

If in one of the devices that is connected together in parallel in this manner, an operating state arises in which either the output voltage drops or the oscillator no longer triggers or interrupts the primary transformer, then the devices that are connected in parallel with the device under consideration feed power back into the device that is either temporarily or permanently out of service, which as a rule leads to the destruction of the controlled rectifier or to a collapse of the output voltage.

SUMMARY

The task of the present invention is to create a synchronous rectifier that is impervious to reverse feed, and that is fully capable of operation in all operating states. In one embodiment, the present invention comprises a synchronous rectifier, including a transformer (3) with a primary winding (2), which is supplied on an alternating basis with current from a direct-current source (1) by means of a switch (4) that is controlled by an oscillator, which transformer (3) exhibits a first secondary winding (5) with ends (C, D), additionally including a first MOSFET (6) and a second MOSFET (7), which are connected into the circuit on an alternating basis in time with the oscillator, whereby the one MOSFET (7) fulfills the function of a rectifier diode, and the second MOSFET (6) that of a recovery diode, the drain electrode of the first MOSFET (6) is joined on the one hand with the one end (C) of the first secondary winding (5), and on the other hand, with an output (14) of the apparatus by means of a storage choke (12), the drain electrode of the second MOSFET (7) supplies current to the other end (D) of the first secondary winding (5), the source electrodes of both MOSFETs (6, 7) are joined with a line (11), and by means of this line, with the other output (15) of the apparatus, and the two outputs (14, 15) of the apparatus are joined by means of a storage and smoothing capacitor (13), characterized by the fact that: the transformer (3) exhibits a second secondary winding (16) with ends (E, F), whereby the one end (E) exhibits the same polarity the as one end (C) of the first secondary winding (5); a control device (17) is present, which exhibits seven connections (21 through 27), whereby the first connection (21) is connected with the one end (E) of the second secondary winding (16), the second connection (22) with the second end (F), the third connection (23) is connected with the one end (C) of the first secondary winding (5), the fourth connection (24) is connected with the other end (D) of the first secondary winding (5), the fifth connection (25) is connected to the line (11), the sixth connection (26) to the gate electrode of the first MOSFET (6), and the seventh connection (27) to the gate electrode of the second MOSFET (7); and the control device (17) contains means for the determination of whether a voltage is being induced through the first and second secondary windings (5, 16), and based on that, whether the synchronous rectifier is working at all, and in the event of a negative case, additionally contains a means for blocking the two MOSFETs (6, 7), whereupon these MOSFETs can continue to carry out their diode function by means of their substrate diodes.

In another embodiment of the present invention, a synchronous rectifier comprises a direct-current current source (1), whose flow of current through the primary winding (2) of a transformer (3) is periodically switched on and off by means of an electronic switch (4)—by an oscillator that is not shown—contains as a controlled rectifier two MOSFETs (6, 7). If two or more such synchronous rectifiers are connected together in parallel, it is necessary and in accordance with the invention that, in the event of the failure of such a synchronous rectifier, the connected MOSFETs (6, 7) are protected from destruction resulting from reverse feed from this rectifier or the remaining ones, This is achieved by means of the insertion of a control device (17) with seven connections (21 through 27) and a second secondary winding (16) of the transformer (3); while a first secondary winding (5) of the transformer (3) takes over the actual power supply of the synchronous rectifier, and supplies current to the connection (23) with one end (C) and to the connection (24) with the other end (D), each of which ends (C, D) also supplies current to the drain of one of the MOSFETs (6, 7), the second secondary winding (16) with ends (E, F) has what is primarily a control function, and supplies current to the connections (21, 22) from one end each (E, F). The gates of the MOSFETs (6, 7) are connected one each to the connections (26, 27), and are connected within the control device (17) with the sources of one additional MOSFET (36, 37) each. The gates of the MOSFETs (36, 37) are triggered from connection (21) by means of the series wiring of a resistor (30) with a diode (31), and are connected on the other side by means of the parallel wiring of a resistor (32) with a capacitor (33) to connection (25), which a line (11) connects with an output (15) of the synchronous rectifier. Connected to the line (11) as well are the sources of the MOSFETs (6, 7), whose gates are also connected by means of resistors (35, 34) with the connection (25). Between the drain of MOSFET 6 and the other output (14) of the synchronous rectifier there is a storage choke (12); the two outputs (14, 15) connected by means of a storage capacitor (13).

BRIEF DESCRIPTION OF THE DRAWINGS

With the aid of the attached drawing, the invention is explained in more detail by means of several embodiments. The following are shown.

DETAILED DESCRIPTION

Figure 1:
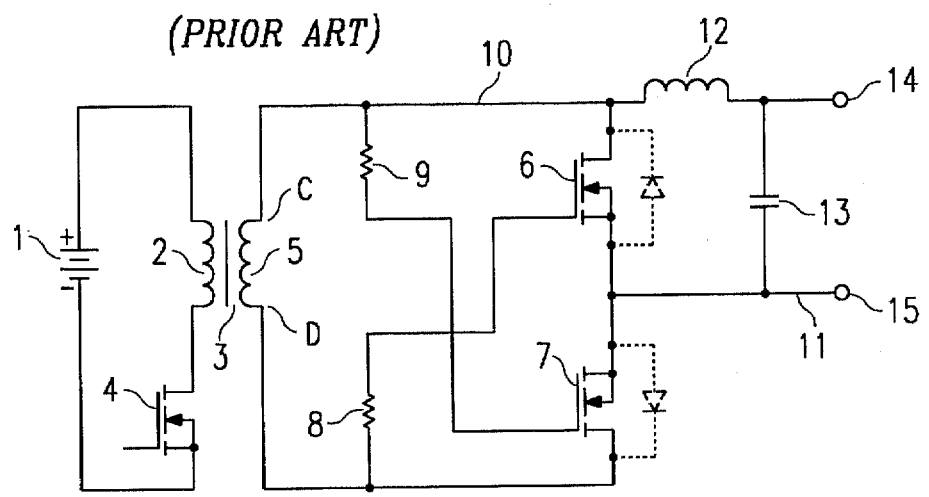
FIG. 1 shows a schematic diagram illustrating a part art rectifier circuit.

In FIG. 1, the state of the art that forms the starting point is shown. A direct-current current source 1 feeds the primary winding, designated by 2, of a transformer 3. The current that supplies the primary winding 2 is periodically interrupted by an electronic switch 4, as a result of which an—approximately rectangular current and voltage pulse arises in the secondary winding 5 of the transformer 3. Two MOSFETs 6, 7, the gates of which are triggered by two resistors 8, 9, are used as controlled rectifiers, and supply two lines 10, 11 with current in phase with the switch 4. The line 11 is connected directly to a—negative—output 15, while between an additional—positive—output 14 and the drain electrode of MOSFET 6, a storage choke 12 is connected. The resistor 8 is connected to the secondary winding 5 at end C, the resistor 9 at end D. The end C of the secondary winding 5, the connection of the resistor 8, the drain electrode of MOSFET 6, and one of the connections of the storage choke 12 form one node, while the end D of the secondary winding 5, the connection of the resistor 8, and the drain electrode of MOSFET 7 form an additional node. The source electrodes of the two MOSFETs 6, 7 are connected to the line 11. Between the outputs 14, 15 there is a capacitor 13 that has a smoothing and storage function.

This circuit requires that a passive load be applied between the outputs 14, 15. if, however, two or more rectifiers of the type that has just been described are connected together in parallel, it is then possible—for example, if the switching function of switch 4 were to fail briefly—for current to flow back into the circuit, which would lead to a short circuit through the MOSFETs 6, 7, which are now conductive, and possibly to their destruction. The two so-called substrate diodes of the MOSFETs 6, 7 are shown as well by means of dashed lines.

Figure 2:
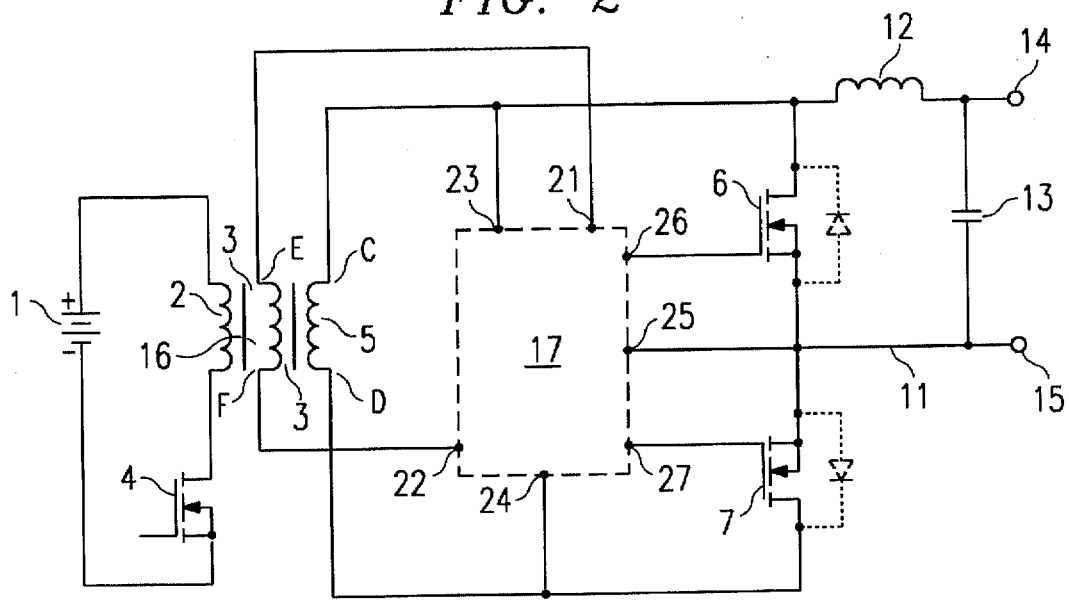
FIG. 2 shows a schematic diagram illustrating one embodiment of the present invention.

The basic circuit diagram of the solution in accordance with the invention is shown in FIG. 2. The transformer 3 exhibits a third winding, the second secondary winding 16, whose polarity relative to the first secondary winding 5 is such that the end C of the first secondary winding 5 exhibits the same polarity as an end E of the secondary winding 16. The polarity of an end F of the secondary winding 16 then corresponds to the polarity of the end D of the first secondary winding 5. In addition, the circuit in accordance with FIG. 2 also includes a control circuit 17, which, in accordance with the invention, contains those circuit elements and in that combination which makes up the solution in accordance with the invention.

The circuit 17 exhibits seven connections 21 through 27 by means of which it is connected both to the known circuit in accordance with FIG. 1, as well as to the second secondary winding 16: the connections 21 and 22 produce the connection with the second secondary winding 16, that is, its ends E, F, the connections 23, 24 produce the connection with the first secondary winding 5, that is, its ends C, D. The connections 26, 27 control the gate electrodes of the MOSFETs 6, 7, while connection 24 is linked with the drain electrode of MOSFET 7, and connection 25 with the line 11 to which the source electrodes of both of the MOSFETs 6, 7 are connected.

Figure 3:
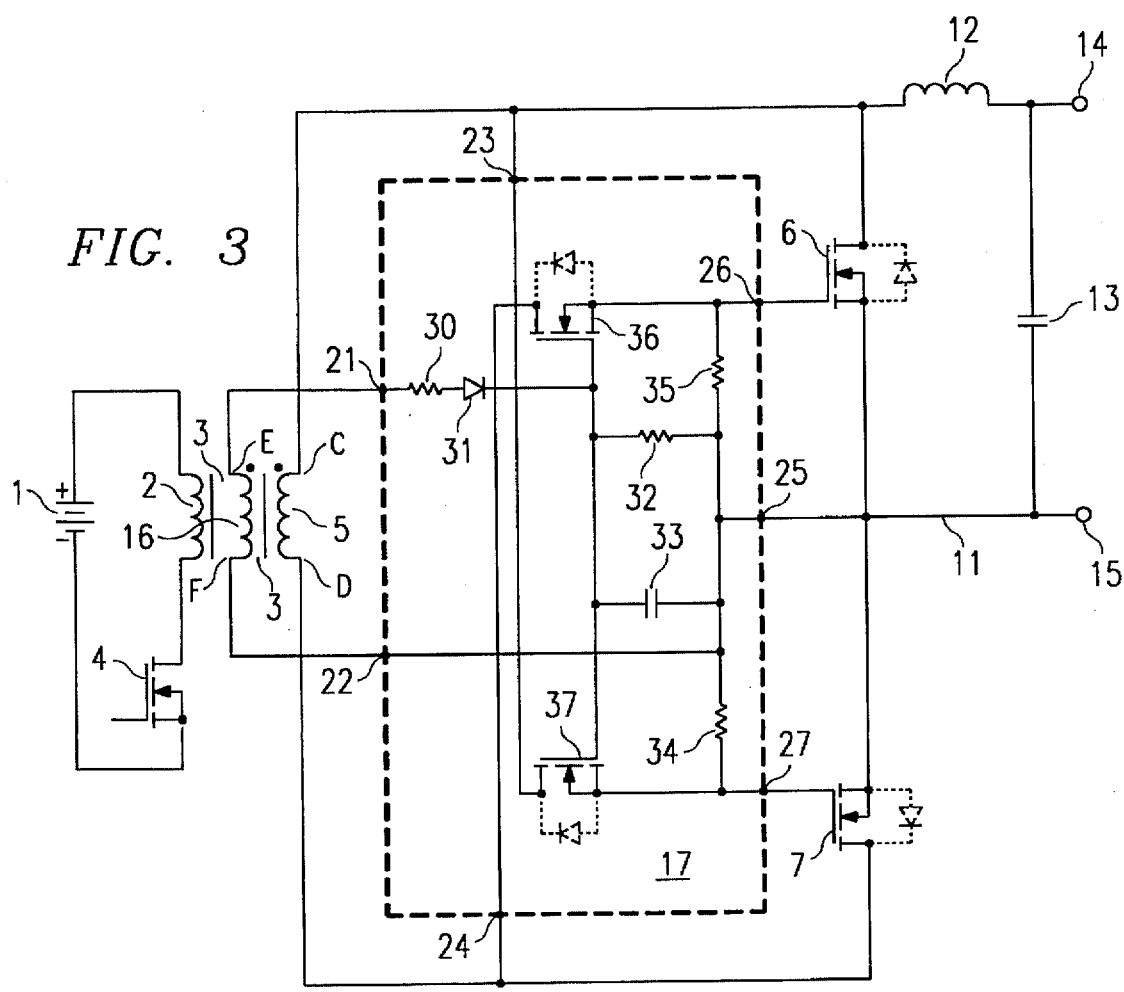
FIG. 3 shows a schematic diagram of the device in FIG. 2, illustrating one embodiment of the control device therein.

FIG. 3 contains the wiring diagram of a first embodiment of the circuit 17 in accordance with the invention. The end E of the second secondary winding 16 is joined by means of a resistor 30 to a diode 31, which is joined on the other side with the gate electrodes of two additional MOSFETs 36, 37. These gate electrodes that have just been mentioned are additionally joined, by means of a resistor 32 that is wired in parallel with a capacitor 33, with the line 11 by means of the connection 25. The end F of the second secondary winding 16 is likewise—within the control circuit 17—attached to the line 11, which in turn is joined by means of a resistor 34 by means of the connection 27 with the gate electrode of the MOSFET 7, and by means of a resistor 35 by means of the connection 26 with the gate electrode of the MOSFET 6. The drain electrode of the MOSFET 36 is joined by means of the connection 24 with the end D of the first secondary winding 5 and the drain electrode of the MOSFET 7, and the drain electrode of the MOSFET 37 is joined by means of the connection 23 with the end C of the first secondary winding 5 and the drain electrode of the MOSFET 6.

As long as a passive load is connected between the outputs 14, 15, the control circuit in accordance with FIG. 3 works, in terms of its effect, like the known circuit in accordance with FIG. 1:

The gate electrodes of the MOSFETS 6, 7 can be charged only if the capacitor 33 exhibits a positive voltage with respect to line 11, so that the MOSFETs 36, 37 are conductive. This is brought about by the output voltage $U_{EF}$ of the second secondary winding 16, which appears only if the transformer 3 is being supplied with pulses by means of switch 4. A charging current for the gate electrodes of the MOSFETs 36, 37 and the capacitor 33 flows through the resistor 30 and is limited by it. During the change of polarity of the voltage $U_{EF}$s, the diode 31 prevents the discharge of the gate capacitances and the capacitor through the second secondary winding 16. In addition, the capacitor 33 maintains the voltage of the gate electrodes of the MOSFETs 36, 37 at the necessary level if $U_{DS}$ (the voltage between drain and source) of the MOSFETs 36, 37 changes.

If, on the other hand, the switch 4 malfunctions and $U_{EF}$ collapses, the capacitor 33 will discharge through the resistor 32, the MOSFETs 36, 37 block, and the gate electrodes of the MOSFETs 6, 7 will discharge through the resistors 34, 35: the MOSFETs 6, 7 likewise block. Essential to the invention is now the fact that the substrate diodes of the MOSFETs 6, 7 maintain the normal rectification function, although, because of their large forward voltage, with a decreased overall efficiency of the apparatus.

Figure 4:
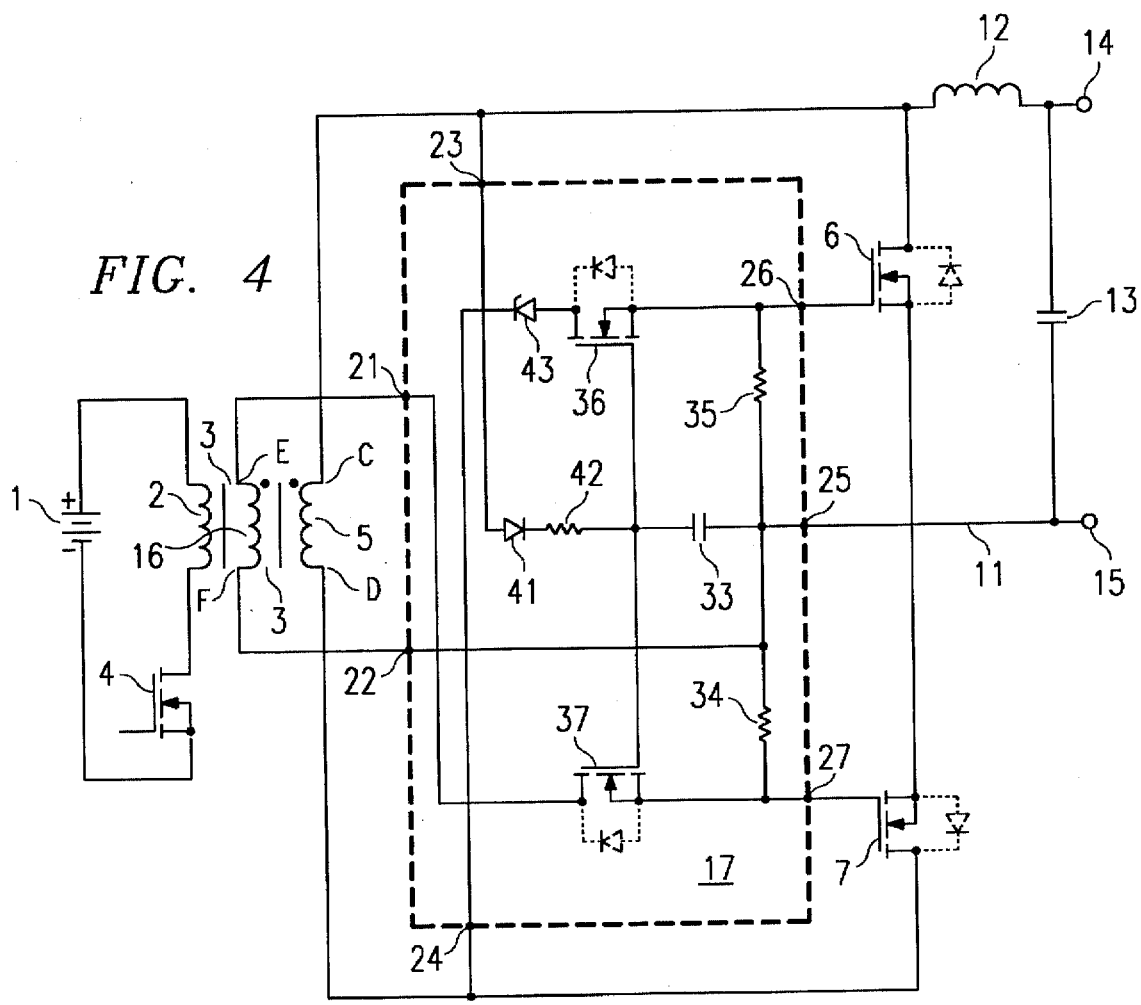
FIG. 4 shows a schematic diagram of the device in FIG. 2, illustrating another embodiment of the control device therein.

In the second embodiment, in accordance with FIG. 4, the two MOSFETs 36, 37, which control the gate electrodes of the MOSFETs 6, 7, are wired differently with respect to their gate and drain electrodes. The two gate electrodes of the MOSFETs 6, 7 are both connected by means of the capacitor 33 to the connection 25, which is joined with the line 11. These pooled gate electrodes are triggered, by means of a diode 41 and the resistor 42 that is connected with it in series, from the signal that is generated at the end C of the first secondary winding 5. This is fed into the control circuit 17 by means of the connection 23. The drain electrode of the MOSFET 36 is joined by means of a zener diode 43 with the connection 24, and this is joined with the end D of the first secondary winding 5. The end F of the second secondary winding 16 is joined directly to the line 11 by means of the connections 22 and 25, while the end E of the second secondary winding 16 supplies—by means of the connection 21—current to the drain electrodes of the MOSFET 37.

If the switch 4 opens and closes at the desired timing frequency, then the effect of the control circuit 17 in accordance with the invention is again the same as that of the known circuit in accordance with FIG. 1: When the switch 4 closes, voltages $U_{CD}$ and $U_{EF}$, which are in the same direction, occur by means of the secondary windings 5 and 16. The capacitor 33 and the gate electrodes of the MOSFETs 36, 37 are charged by means of the diode 41 and the resistor 42—which limits the charging current; the MOSFETs 36, 37 become conductive at the appropriate drain-sources voltage. At the change of polarity of $U_{CD}$, the diode 41 prevents the discharge of the capacitor through the first secondary winding 6. In addition, the capacitor 33 supports the charging of the gate electrodes of the MOSFETs 36, 37 in the event of changing drain-source voltage.

If the switch 4 now fails—while it remains open, with an active load between the outputs 14, 15, the voltage that is present from outside will indeed be fed back in; however, the zener diode 43 reduces this voltage to such an extent that it is below the threshold voltage between gate and source of the MOSFET 6, and the MOSFET 6 therefore blocks. In addition, the secondary winding 16 also no longer has a voltage, and thus the MOSFET 7 no longer does either. Both MOSFETs 6, 7 block, and only the substrate diodes of the MOSFETs 6, 7 are still with an effect, as described by means of FIG. 3.

Both with the state of the art in accordance with FIG. 1 as well as the embodiments in accordance with FIGS. 3, 4 of the solution in accordance with the invention in FIG. 2, all parts of the apparatus that bring about the actual regulation of the voltage that is present between the outputs 14, 15 are left out, since on the one hand, in accordance with the state of the art such parts are assumed to be known, while on the other, they are also not affected by the control device 17 in accordance with the invention.

What is claimed is:

1. Synchronous rectifier, comprising a transformer with a primary winding which is supplied on an alternating basis with current from a direct-current source by means of a switch that is controlled by an oscillator, the transformer having a first secondary winding with first and second ends, further comprising a first MOSFET and a second MOSFET which are connected into the circuit on an alternating basis in time with the oscillator, the first MOSFET functioning as a rectifier diode and the second MOSFET functioning as a recovery diode, a drain electrode of the first MOSFET being joined with the first end of the first secondary winding and with a first output of the synchronous rectifier by means of a storage choke, a drain electrode of the second MOSFET supplying current to the second end of the first secondary winding, the source electrodes of first and second MOSFETs being joined by a line with a second output of the synchronous rectifier, and the first and second outputs being joined by means of a storage and smoothing capacitor, the synchronous rectifier further comprising:

the transformer having a second secondary winding with first and second ends, the first end of the second secondary winding having the same polarity the as first end of the first secondary winding;

a control device a first connection of the control device being connected with the first end of the second secondary winding, a second connection of the control device being connected with the second end of the second secondary winding, a third connection of the control device being connected with the first end of the first secondary winding, a fourth connection of the control device being connected with the second end of the first secondary winding, a fifth connection of the control device being connected to the line, a sixth connection of the control device being connected to a gate electrode of the first MOSFET, and a seventh connection of the control device being connected to a gate electrode of the second MOSFET, the control device contains means for the determination of whether a voltage is being induced through the first and second secondary windings to determine whether the synchronous rectifier is working, and means for blocking the first and second MOSFETs upon determining that the synchronous rectifier is not working, whereupon the first and second MOSFETs will continue to carry out their diode function by means of first and second substrate diodes.

2. The synchronous rectifier in accordance with claim 1, further comprising:

the means contained in the control device for the determination of an induction voltage through the first and second secondary windings comprises a first resistor connected with the first connection of the control device and which is connected to the fifth connection of the control device by a a diode and a second resistor connected in parallel with a second capacitor which are also connected with the second connection of the control device, whereby the voltage through the second capacitor is the value that is to be determined, the means of blocking the first and second MOSFETs, whose gate electrodes are connected with the connection point between the diode and the second resistor, a drain electrode of a third MOSFET being connected with the fourth connection of the control device, a drain electrode of a fourth MOSFET being connected with the third connection of the control device, a source electrode of the third MOSFET being connected to the fifth connection of the control device by a third resistor and to the sixth connection of the control device, a source electrode of the fourth MOSFET being connected on a first side by a fourth resistor to the fifth connection of the control device and on a second side being connected to the seventh connection of the control device;

wherein when an induction voltage is present in the second secondary winding the gate electrodes of the third and fourth MOSFETs are continuously positive to the extent that each of the third and fourth MOSFETs are conductive when the drain-source voltage is correct, and the first and second MOSFETs work at the correct rhythm, and wherein when induction voltage of the third and fourth MOSFETs is below a select potential, the third and fourth MOSFETs are not conductive and the first and second MOSFETs work in substrate-diode operation.

3. The synchronous rectifier in accordance with claim 1, further comprising:

the means available in the control device for the determination of an induction voltage through the first and second secondary windings comprises:

a second diode and a fifth resistor connected in series with the third connection of the control device such that when the third connection of the control device has a positive polarity the second diode and the fifth resistor receives current and charges a second capacitor connected to the fifth connection of the control device;

a third MOSFET having a source electrode connected to the sixth connection of the control device, and the fourth MOSFET having a source electrode connected to the seventh connection of the control device;

a third resistor being connected between the fifth and the sixth connections of the control device, and a fourth resistor connected between the fifth and the seventh connections of the control device;

a zener diode having a cathode connected to a drain electrode of the third MOSFET and an anode connected to the fourth connection of the control device;

a galvanic connection between the gate electrodes of the third and fourth MOSFETs and the positive terminal of the second capacitor;

a second galvanic connection between the gate electrode of the fourth MOSFET and the first connection of the control device, and third galvanic connection between the first and the fifth connections of the control device, whereby the second capacitor is always charged positively via the second diode and the fifth resistor if the voltages through the first and second secondary windings are positive;

wherein the means for blocking the first and second MOSFETs further, in the case of a breakdown of the induction voltages through the first and second secondary windings, discharges the gate electrodes of the third and fourth MOSFETs and the second capacitor via the substrate diodes of the third and fourth MOSFETs, wherein the first and second MOSFETs transition into diode operation.

* * * * *